(12) United States Patent
Kraeuter

(10) Patent No.: US 11,833,894 B2
(45) Date of Patent: Dec. 5, 2023

(54) POWER SHIFTABLE MULTI-GEAR TRANSMISSION HAVING FREEWHEEL

(71) Applicant: Robert Bosch GmbH, Stuttgart (DE)

(72) Inventor: Janek Kraeuter, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 17/430,988

(22) PCT Filed: Feb. 12, 2020

(86) PCT No.: PCT/EP2020/053528
§ 371 (c)(1),
(2) Date: Aug. 13, 2021

(87) PCT Pub. No.: WO2020/165203
PCT Pub. Date: Aug. 20, 2020

(65) Prior Publication Data
US 2022/0212526 A1    Jul. 7, 2022

(30) Foreign Application Priority Data
Feb. 14, 2019   (DE) .................. 10 2019 202 015.1

(51) Int. Cl.
*F16H 3/089*    (2006.01)
*B60K 1/00*    (2006.01)
(Continued)

(52) U.S. Cl.
CPC .............. *B60K 1/00* (2013.01); *F16H 3/089* (2013.01); *B60K 17/26* (2013.01); *F16H 2003/0818* (2013.01); *F16H 2200/0021* (2013.01)

(58) Field of Classification Search
CPC .... B60K 1/00; B60K 17/26; B60K 2001/001; F16H 3/089; F16H 2003/0818;
(Continued)

(56) References Cited

U.S. PATENT DOCUMENTS 10,808,814 B2 * 10/2020 Zhong ................... F16H 37/02
10,948,049 B2 * 3/2021 Yang ..................... F16H 3/089
(Continued)

FOREIGN PATENT DOCUMENTS

CN    201992007 U    9/2011
CN    102392885 A    3/2012
(Continued)

OTHER PUBLICATIONS

Translation of International Search Report for Application No. PCT/EP2020/053528 dated Mar. 30, 2020 (2 pages).

*Primary Examiner* — Jacob S. Scott
*Assistant Examiner* — Farhana Pervin
(74) *Attorney, Agent, or Firm* — Michael Best & Friedrich LLP

(57) ABSTRACT

The invention relates to a power-shiftable multi-gear transmission (12) having a driven input shaft (14) and a shaft (16). The power-shiftable multi-gear transmission (12) comprises at least one first gear stage (18) and one second gear stage (26) which are in each case configured as spur gear teeth. At least one first power transmission element is arranged on the input shaft (14) by means of a freewheel (21).

6 Claims, 3 Drawing Sheets

(51) Int. Cl.
*B60K 17/26* (2006.01)
*F16H 3/08* (2006.01)

(58) Field of Classification Search
CPC ..... F16H 2200/0021; F16H 2200/0034; F16H 2200/2035; F16H 3/10
See application file for complete search history.

(56) References Cited

U.S. PATENT DOCUMENTS

| | | | |
|---|---|---|---|
| 10,968,982 B2* | 4/2021 | Barendrecht | ........ B60K 17/043 |
| 2014/0033844 A1* | 2/2014 | Rothvoss | ................ F16H 3/089 |
| | | | 74/335 |
| 2018/0126839 A1* | 5/2018 | Park | ........................ F16H 3/089 |
| 2019/0383373 A1* | 12/2019 | Engerman | .............. B60K 17/12 |

FOREIGN PATENT DOCUMENTS

| | | |
|---|---|---|
| CN | 204647177 U | 9/2015 |
| CN | 105041988 A | 11/2015 |
| CN | 106931089 A | 7/2017 |
| DE | 102015121157 A1 | 6/2017 |
| DE | 102016212867 A1 | 1/2018 |
| KR | 20160035663 A | 4/2016 |
| KR | 20170047453 A | 5/2017 |
| KR | 20170088670 A | 8/2017 |
| WO | 2014173651 A1 | 10/2014 |

* cited by examiner

POWER SHIFTABLE MULTI-GEAR TRANSMISSION HAVING FREEWHEEL

BACKGROUND

The invention relates to a power-shiftable multiple-gear transmission with a freewheel. Furthermore, the invention relates to the use of the power-shiftable multiple-gear transmission for electric vehicles and hybrid vehicles in the passenger car, utility vehicle and truck field.

DE 10 2016 212 867 A1 relates to a transmission for an electric drive, in particular for a motor vehicle. The transmission comprises an electric machine, a drive shaft and at least a first and a second gear stage. The first gear stage can be shifted via a first clutch, and the second gear stage can be shifted via a second clutch. The first clutch is closed by means of a mechanical spring in the normal state, and can be opened by way of a pressure build-up which is, in particular, hydraulic by means of a pump. The second clutch is open in the normal state and can be closed by way of a pressure build-up which is, in particular, hydraulic by means of a pump. In the case of the transmission, the first gear is engaged in the normal state of the first and second clutch, the first clutch being closed and the second clutch being open. In order to shift over the transmission into the second gear, the first clutch is opened and the second clutch is closed.

DE 10 2015 121 157 A1 relates to a hybrid drive train for a motor vehicle. The drive train comprises a first drive unit and a second drive unit. In order to change the two drive units, the drive train comprises two clutches. In one preferred embodiment, a gear set of a first transmission arrangement is configured to set up a first forward gear stage, it being possible for an idler gear of said gear set to be connected by means of a freewheel to the shaft which is assigned to said idler gear.

SUMMARY

According to the invention, a power-shiftable multiple-gear transmission with a driven input shaft and a shaft is proposed, in the case of which multiple-gear transmission a first gear stage and at least one second gear stage are configured which are configured in each case as spur gear toothing systems. At least one first power transmission element is arranged by means of a freewheel on the input shaft. By way of the solution which is proposed according to the invention, in the case of shifting operations under load, firstly the shifting quality is improved considerably, and secondly smoother running of the multiple-gear transmission which is proposed according to the invention can be achieved on account of the freewheel; the NVH (Noise Vibration Harshness) behavior is considerably improved.

In one development of the solution which is proposed according to the invention, the power-shiftable multiple-gear transmission is driven on the driven input shaft via at least one electric machine.

In one development of the power-shiftable multiple-gear transmission which is proposed according to the invention, the first gear stage is configured with a first transmission ratio $i_1$ by way of the first power transmission element, configured as a first pinion on the freewheel, and a first gearwheel, in each case in a manner comprising spur gear toothing systems. The second gear stage of the power-shiftable multiple-gear transmission which is proposed according to the invention has a second transmission ratio $i_2$, and is produced by way of a second pinion which meshes with a second gearwheel. Here too, spur toothing systems are configured on the second pinion and on the second gearwheel.

In one development of the solution which is proposed according to the invention, the power-shiftable multiple-gear transmission has, moreover, a final gear stage which is formed by way of a differential gear. In combination with the first transmission ratio $i_1$ or the second transmission ratio $i_2$, the final gear stage forms the first gear or the second gear of the power-shiftable multiple-gear transmission.

In the case of the power-shiftable multiple-gear transmission which is proposed according to the invention, the final gear stage is also provided with a spur gear toothing system, and comprises a third pinion and a third gearwheel which mesh with one another. The third gearwheel serves as drive for the differential, via which the torques and rotational speeds are distributed to the wheels. This solution is extremely space-saving and weight-saving.

In the case of the power-shiftable multiple-gear transmission which is proposed according to the invention, a first clutch is used within the context of the first gear stage and a second clutch is used within the context of the second gear stage. If the first clutch is closed, a first gear with a first transmission ratio $i_1$ is realized at the power-shiftable multiple-gear transmission. If the first clutch is open and the second clutch is closed, the power-shiftable multiple-gear transmission which is proposed according to the invention is shifted into a second gear within the context of the second gear stage. In the second gear, there is the second transmission ratio $i_2$, that is to say a different transmission ratio in comparison with the first gear stage.

In the case of the power-shiftable multiple-gear transmission which is proposed according to the invention, the second gearwheel of the second gear stage and the third pinion of the final gear stage are arranged fixedly on the shaft for conjoint rotation.

The power-shiftable multiple-gear transmission is configured in such a way that a component of the first gear stage, for example the first gearwheel, is part of the first clutch, a part of the second gear stage, namely the second pinion, being a part of the second clutch. Secondly, the first gearwheel of the first gear stage and the second gearwheel of the second gear stage are configured in each case in a sleeve shape on the power-shiftable multiple-gear transmission which is proposed according to the invention. The first gearwheel of the first gear stage is mounted rotatably on the shaft. In contrast, the second gearwheel of the second gear stage is mounted fixedly on the shaft for conjoint rotation. On account of the alternately non-rotational and rotational mountings of the components of the first gear stage and the second gear stage, the power-shiftable multiple-gear transmission which is proposed according to the invention can be shifted via the two clutches in each case into the first gear and into the second gear, without further shifting components being required. Moreover, the invention relates to an E-axle module which can be configured as a front axle E-axle module or as a rear axle E-axle module, and is used in the case of an electrically driven or hybrid driven vehicle.

The power-shiftable multiple-gear transmission which is proposed according to the invention and is preferably driven on its driven input shaft by way of at least one electric machine is used on the E-axle module, whether intended for the front axle or whether intended for the rear axle of an electrically driven or hybrid driven vehicle.

Moreover, the invention relates to the use of the power-shiftable multiple-gear transmission in an E-axle module of an electrically driven or hybrid driven vehicle.

Advantages of the Invention

The power-shiftable multiple-gear transmission which is proposed according to the invention realizes a shifting concept with at least two spur gear pairs, with the result that at least a first transmission ratio $i_1$ and a second transmission ratio $i_2$ can be realized. In comparison with shifting concepts from the prior art, in the case of which, for example, planetary gear transmissions are shifted, the driving comfort in the case of a required power-shifting capability of the power-shiftable multiple-gear transmission can be improved considerably by way of the power-shiftable transmission which is proposed according to the invention. Moreover, a parking lock function can be realized on the power-shiftable multiple-gear transmission by way of the simultaneous actuation of the two clutches, whether they are actuated electrically, electromagnetically, mechanically, electrohydraulically or hydraulically, which has up to now required expensive solutions.

A considerable cost saving can be realized by way of the omission of the conventional parking lock actuator system. Flexible adaptations to installation spaces which are required by the customer can be realized by way of the circumstance that the first clutch for the first gear stage and the second clutch for the second gear stage are disconnected from one another. In comparison with solutions, in the case of which, for example, electric machines interact with planetary transmissions or are even integrated into them, a considerably higher shifting comfort and/or a considerable improvement of the driving comfort in the case of shifting operations can be realized. Moreover, the smooth running of the power-shiftable multiple-gear transmission which is proposed according to the invention can be improved considerably by way of the use of the freewheel, on which the first power transmission element in the form of the first pinion is received. Thus, for example, in the case of an engaged first gear stage, the second pinion does not corotate, as a result of which the smooth running which is reflected in the NVH (Noise Vibration Harshness) behavior is improved considerably. In the case of an engaged second gear stage, the first power transmission element in the form of the first pinion and the second gearwheel which meshes with it do not corotate, as a result of which, in the case of an engaged second gear stage and a deactivated first gear stage, the Noise Vibration Harshness behavior of the multiple-gear transmission which is proposed according to the invention is improved considerably.

The final gear stage which is also called a "final drive" is at the same time the differential gear. Since the gearwheel of the final gear stage drives the differential gear, installation space, weight and resulting costs can be saved.

BRIEF DESCRIPTION OF THE DRAWINGS

The invention will be described in greater detail in the following text on the basis of the drawing, in which.

DETAILED DESCRIPTION

Figure 1:
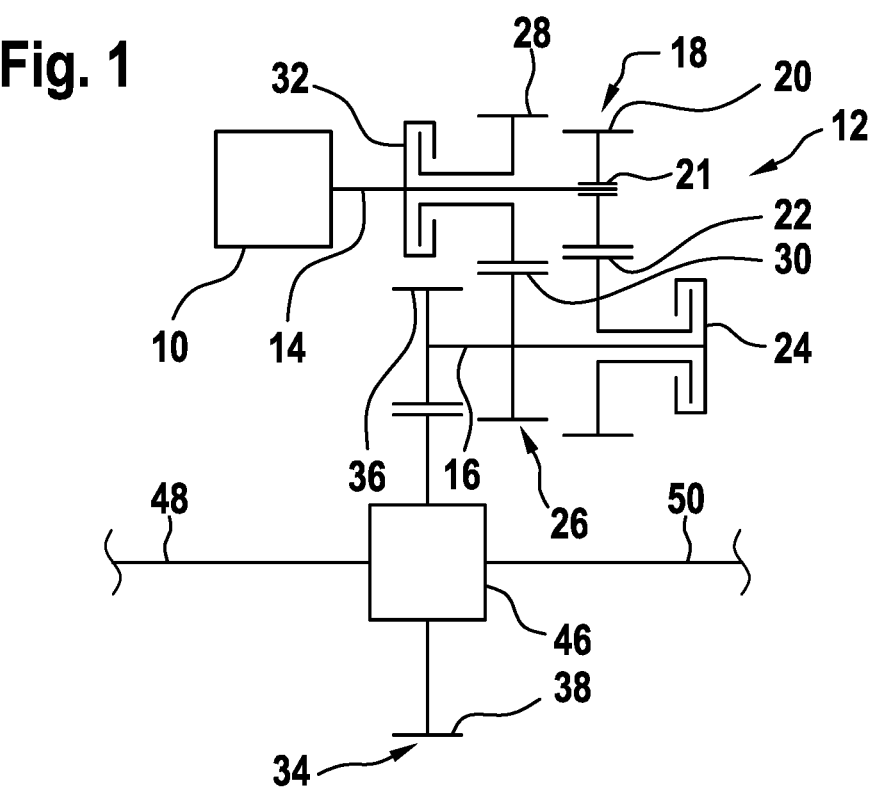
FIG. 1 shows a first design variant of a power-shiftable multiple-gear transmission, with an electric machine, a differential and output shafts which branch off from the latter.

FIG. 1 shows a power-shiftable multiple-gear transmission 12 which is proposed according to the invention and is driven by an electric machine 10. The power-shiftable multiple-gear transmission 12 comprises a driven input shaft 14 and a shaft 16. The input shaft 14 is driven by the electric machine 10. A first gear stage 18 with a first transmission ratio $i_1$ is realized on the power-shiftable multiple-gear transmission 12. The first gear stage 18 comprises a first power transmission element, configured as a first pinion 20 which is arranged on a freewheel 21 on the input shaft 14, and a first gearwheel 22 which is firstly part of a first clutch 24 and secondly is arranged rotatably on the shaft 16. As is apparent from the diagrammatic illustration according to FIG. 1, the shaft 16 penetrates the first gearwheel 22 of the first gear stage 18, which first gearwheel 22 is advantageously of sleeve-shaped configuration here.

Furthermore, the power-shiftable multiple-gear transmission 12 in accordance with the diagrammatic illustration in FIG. 1 comprises a second gear stage 26. This is produced by way of a second pinion 28 which is part of a second clutch 32. This meshes with a second gearwheel 30 which is arranged fixedly on the shaft 16 for conjoint rotation.

Moreover, a final gear stage 34 is provided on the power-shiftable multiple-gear transmission 12. The final gear stage 34 which is also called a "final drive" is the differential 46 and, in combination with the first transmission ratio $i_1$ or the second transmission ratio $i_2$, forms the first gear or the second gear of the power-shiftable multiple-gear transmission. The two-gear transmission which is shown might be expanded to more than the two gears which are shown.

As is apparent, furthermore, from the illustration according to FIG. 1, a third pinion 36 is received fixedly on the shaft 16 of the power-shiftable multiple-gear transmission 12 for conjoint rotation. Said third pinion 36 meshes with a third gearwheel 38 which is part of a differential 46.

A first axle output 48 and a second axle output 50 run from the differential gear 46 to driven wheels (not shown in FIG. 1) of an electrically driven vehicle.

In the case of the power-shiftable multiple-gear transmission 12 which is proposed according to the invention in accordance with the illustration in FIG. 1, all the toothing systems on the first power transmission element, that is to say on the first pinion 20, on the first gearwheel 22, the second pinion 28, the second gearwheel 30, the third pinion 36 and the third gearwheel 38, are configured as spur toothing systems. As a result, the shifting capability under load can be influenced favorably in an advantageous way, and the smooth running can be improved considerably on account of the damping of vibrations which are produced within the power-shiftable multiple-gear transmission 12. Secondly, the freewheel 21 avoids that the rotation of non-required components is avoided in accordance with the engaged first or second gear stage, which considerably improves the NVH (Noise Vibration Harshness) behavior of the power-shiftable multiple-gear transmission 12 which is proposed according to the invention. In the case of an engaged first gear stage 18, the second pinion 28 does not rotate; in the case of an engaged second gear stage 26, the first power transmission element, configured as a first pinion 20, received on the freewheel 21, and the first gearwheel 22 do not corotate, which likewise has a positive influence on the smooth running, that is to say the Noise Vibration Harshness behavior of the power-shiftable multiple-gear transmission 12 which is proposed according to the invention.

Figure 2:
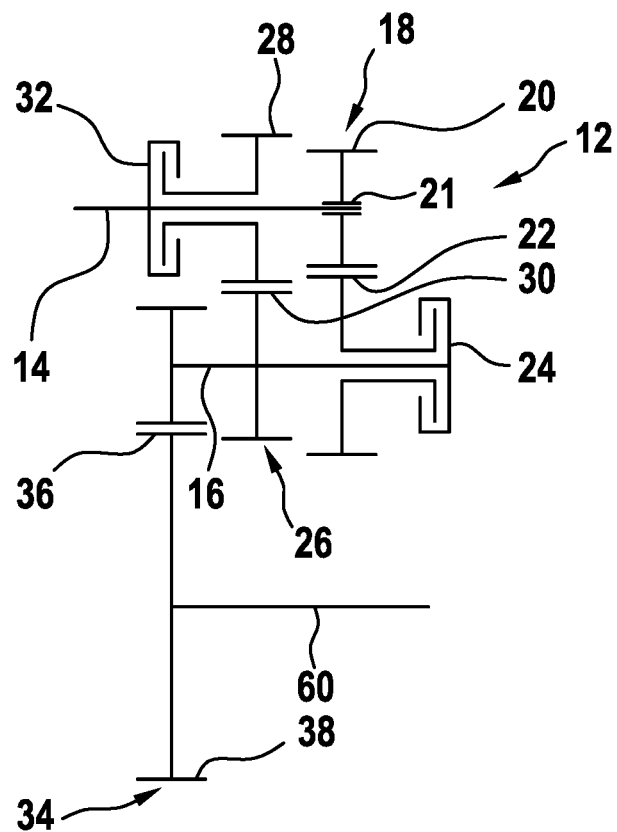
FIG. 2 shows a diagrammatic illustration of the power-shiftable multiple-gear transmission which is proposed according to the invention, with an output shaft.

FIG. 2 shows a slightly modified design variant of the power-shiftable multiple-gear transmission 12 which is proposed according to the invention.

In the design variant according to FIG. 2 of the power-shiftable multiple-gear transmission 12, the first gear stage 18, the second gear stage 26 and the final gear stage 34 are realized. In contrast to the design variant of the power-shiftable multiple-gear transmission 12 according to FIG. 1, a differential 46 which is part of the third gearwheel 38 in the variant according to FIG. 1 is missing in the embodiment according to FIG. 2. Instead, starting from the third gearwheel 38 of the final gear stage 34, an output shaft 60 extends to a drive component (not shown in further detail here) of a drive train.

The components of the first gear stage 18, that is to say the first power transmission element, that is to say the first pinion 20, the first gearwheel 22 and the first clutch 24, are identical to the components of the first gear stage 18 according to FIG. 1. The same applies to the components of the second gear stage 26 in the design variant according to FIG. 2, and to the components of the final gear stage 34 apart from the absence of a differential gear 46 in the design variant according to FIG. 2.

Figure 3:
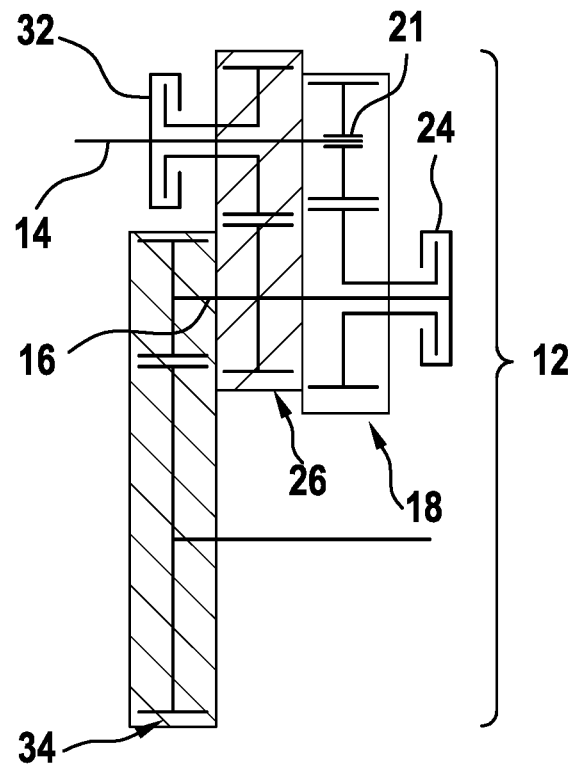
FIG. 3 shows the power-shiftable multiple-gear transmission in accordance with the illustration in FIG. 2, with the individual gear stages and the two clutches which are disconnected from one another.

The individual gear stages of the power-shiftable multiple-gear transmission 12 can be gathered from the illustration according to FIG. 3.

In an analogous manner to the above-described FIGS. 1 and 2, the illustration according to FIG. 3 shows that the power-shiftable multiple-gear transmission 12 has the first gear stage 18, the second gear stage 26 and the final gear stage 34. Depending on the actuation of the first clutch 24, that is to say the engagement of the first gear stage 18 or the actuation of the second clutch 32 in order to realize the second gear stage 26, the final gear stage 34 is driven via the shaft 16. This means that the first transmission ratio $i_1$ is realized in the first gear stage 18, whereas the second transmission ratio $i_2$ is realized in the second gear stage 26. There is a corresponding rotational speed in the final gear stage 34 in a manner which is dependent on the output rotational speed, at which the shaft 16 rotates. The first transmission ratio $i_1$ and the second transmission ratio $i_2$ are then designed in such a way that $i_1$ is greater than $i_2$. As a result, the transmission ratio in the third final gear stage 34 is either given by $i_{ges1}=i_1 \cdot i_{Endgang}$ in the case of an engaged first gear stage 18, or the transmission ratio $i_{ges2}=i_2 \cdot i_{Endgang}$ is present if the second gear stage 26 is engaged.

Figure 4:
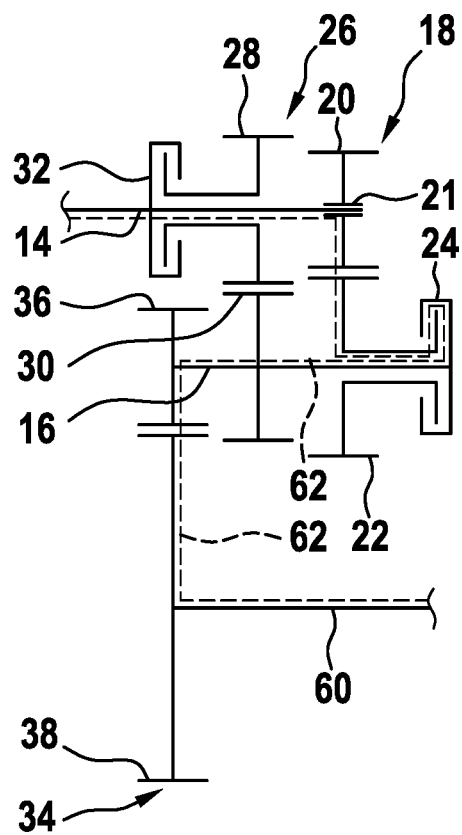
FIG. 4 shows the power-shiftable multiple-gear transmission with an illustrated power flow in the case of an engaged first gear stage.

The illustration according to FIG. 4 shows the power flow 62 which is set in the case of an engaged first gear stage 18 in the power-shiftable multiple-gear transmission 12 which is proposed according to the invention.

For the activation of the first gear stage 18, the first clutch 24 is closed. The power flow 62 runs, starting from the input shaft 14 which is driven, for example, via the electric machine 10, the open second clutch 32 to the first power transmission element, for example a first pinion 20. This is received in the freewheel 21 on the driven input shaft 14. The first power transmission element, configured as a first pinion 20, drives the first gearwheel 22 in accordance with the power profile of the power flow 62, which first gearwheel 22 transmits a rotation via the closed first clutch 24 to the shaft 16 which for its part drives the third pinion 36, arranged fixedly on it, of the final gear stage 34. The third pinion 36 which is arranged fixedly on the shaft 16 for conjoint rotation drives the third gearwheel 38 which in turn drives the output shaft 60. In the shifting state shown in FIG. 4 of the power-shiftable multiple-gear transmission 12 which is proposed according to the invention, there is the transmission ratio $i_{ges1}=i_1 \cdot i_{Endgang}$. In order to realize the power flow 62 (cf. dashed illustration in FIG. 4) within the first gear stage 18, the first clutch 24 is closed, whereas the second clutch 32 is opened. In the shifting state, shown in FIG. 4, of the power-shiftable multiple-gear transmission 12 which is proposed according to the invention, a part of the second clutch 32 corotates, just like the second gearwheel 30 which does not transmit any torque and is driven fixedly on the shaft 16 for conjoint rotation, but does not transmit any torque.

Figure 5:
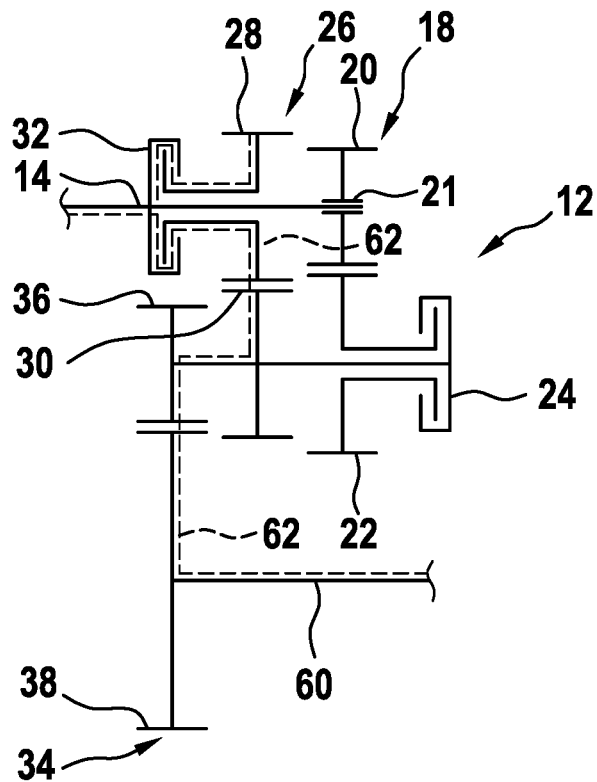
FIG. 5 shows the resulting power flow in the power-shiftable multiple-gear transmission which is proposed according to the invention, in the case of an engaged second gear stage.

FIG. 5 shows the power flow 62 which is set in the power-shiftable multiple-gear transmission 12 which is proposed according to the invention, in the case of an engaged second gear stage 26.

In the illustration according to FIG. 5, the first clutch 24 is open, whereas the second clutch 32 is closed.

Starting from the driven input shaft 14, the drive torque, for example of an electric machine 10, is transmitted via the closed second clutch 32 to the second pinion 28. From there, the torque is transmitted via a spur toothing system to the second gearwheel 30 which is arranged fixedly on the shaft 16 for conjoint rotation. By the shaft 16, the torque is transmitted to the third pinion 36 which, within the context of a spur gear toothing pairing, meshes with the third gearwheel 38 of the final gear stage 34 and transmits the torque to the output shaft 60 in accordance with the power flow 62 according to FIG. 5. In the shifting state which is shown in FIG. 5, there is the transmission ratio $i_{ges2}=i_2 \cdot i_{Endgang}$. According to FIG. 5, no torque is transmitted via the first power transmission element which is arranged by way of the freewheel 21 on the driven input shaft 14 to the first gearwheel 22 which can be rotated on the shaft 16, since the first clutch 24 is open. In the case of an engaged second gear stage 26, the first power transmission element in the form of the first pinion 20 and the second gearwheel 30 are at a standstill. As a result, the smooth running of the power-shiftable multiple-gear transmission 12 which is proposed according to the invention is influenced in a positive manner, since only those components which are required for the transmission of torque rotate.

For the realization of a parking lock function, the two clutches 24, 32 are closed on the power-shiftable multiple-gear transmission 12, with the result that the power-shiftable multiple-gear transmission 12 is blocked, and neither the driven input shaft 14 nor the shaft 16 can be set in rotation. All of the components which mesh with the blocked input shaft 14 or the blocked shaft 16 are likewise blocked, with the result that no rotation can take place, and a parking lock function can be realized without the provision of further components in the power-shiftable multiple-gear transmission 12.

Figure 6:
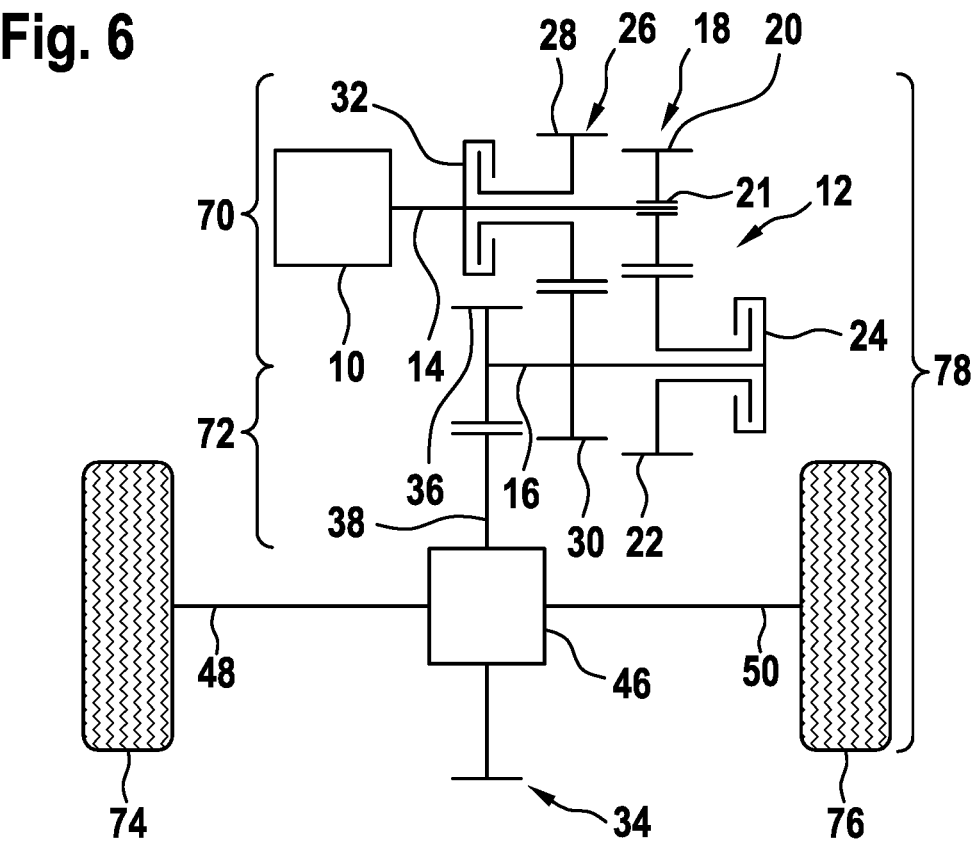
FIG. 6 shows an E-axle module for an electric vehicle with a power-shiftable multiple-gear transmission, an electric machine, a differential and two driven wheels.

FIG. 6 shows a diagrammatic illustration of an E-axle module which can be used on the rear axle or on the front axle of an electric vehicle.

It is apparent from the illustration according to FIG. 6 that the E-axle module 78 which is shown comprises the above-described power-shiftable multiple-gear transmission 12 and an electric machine 10 which drives the latter. Moreover, the E-axle module 78 according to FIG. 6 has the differential gear 46 which is part of a final gear stage 34. From the differential gear 46, a first axle output 48 extends to the first driven wheel 74, whereas a second axle output 50 extends to a second driven wheel 76.

The power-shiftable multiple-gear transmission 12 which is shown comprises two spur gear stages, namely the first spur gear stage 70 and the second spur gear stage 72. In the case of the power-shiftable multiple-gear transmission 12 which is proposed according to the invention, two gears are realized independently of the spur gear stages 70, 72. A relatively great axle offset or axle spacing from a motor input shaft to a transmission output shaft can be realized by way of the second spur gear stage 72. By way of adaptation of the axle deflection angle which is produced by way of the arrangement of the transmission input shaft, the intermediate shaft and the output shaft, the installation space which the power-shiftable multiple-gear transmission 12 which is proposed according to the invention takes up can be adapted in a flexible manner.

It can be gathered from FIG. 6 that the power-shiftable multiple-gear transmission 12 which is shown here is driven as part of an E-axle module 78 on the driven input shaft 14 via the electric machine 10. The construction of the power-shiftable multiple-gear transmission 12 which is shown in FIG. 6 and is integrated into the E-axle module 78 corresponds substantially to the construction of the power-shiftable multiple-gear transmission 12 in accordance with the design variant which is shown in FIG. 1. The power-shiftable multiple-gear transmission 12 which is proposed according to the invention comprises the first gear stage 18 and, furthermore, the second gear stage 26 which interact with the final gear stage 34 in accordance with their first transmission ratio $i_1$ and their second transmission ratio $i_2$, respectively. Depending on which of the two clutches 24 and 32 is activated, either the first gear stage 18 with the first transmission ratio $i_1$ is active on the power-shiftable multiple-gear transmission 12 or, in the case of actuation of the second clutch 32, the second gear stage 26 with the second transmission ratio $i_2$ is active. Depending on whether, in the case of corresponding actuation of the two clutches 24, 32, the first gear stage 18 or the second gear stage 26 is engaged, a corresponding output rotational speed is set at the third pinion 36 of the final gear stage 34. In a manner which is dependent on the engaged gear stage 18, 26, there is either the transmission ratio $i_{ges1}=i_1 \cdot i_{Endgang}$ in the final gear stage 34 if the first gear stage 18 is active. As an alternative, there is the possibility, in the case of a closed second clutch 32, to perform the drive via the second gear stage 26 with the second transmission ratio $i_2$. In this case, there is the abovementioned transmission ratio $i_{ges2}=i_2 \cdot i_{Endgang}$ at the final gear stage 34.

In the design variant which is shown in FIG. 6, the final gear stage 34 comprises the differential gear 46 which is integrated into the third gearwheel 38.

In a modification of the design variant of the E-axle module 78 according to FIG. 6, instead of the power-shiftable multiple-gear transmission 12 which is shown there and drives the final gear stage 34, the final gear stage 34 can be modified in such a way that the differential gear 46 is dispensed with and the third gearwheel 38 drives the output shaft 60 which is coupled rigidly to it, as is shown in the design variant according to FIG. 2.

In relation to the preceding FIGS. 1 to 6, it is to be noted that the first clutch 24 and the second clutch 32 can be actuated electrically or hydraulically and can be shifted independently of one another. In an advantageous way, in the power-shiftable multiple-gear transmission 12 which is proposed according to the invention, the first pinion 20 which serves as a first power transmission element is arranged in the freewheel 21, and the second gearwheel 30 and the third pinion 36 are arranged in each case fixedly on the driven input shaft 14 or on the shaft 16 for conjoint rotation. In contrast, both the second pinion 28 and the first gearwheel 22 are of sleeve-shaped configuration and are designed in such a way that one part of the mentioned components at the same time represents a friction disk or a friction component for the first clutch 24 or the second clutch 32. In an advantageous way, both the components of sleeve-shaped nature, the second pinion 28 and the first gearwheel 22, are configured in such a way that the driven input shaft 14 and the shaft 16 extend through said components of sleeve-shaped configuration and thus make the realization of the different gear stages, a first gear stage 18 and second gear stage 26, with the dedicated transmission ratios $i_1$, $i_2$ possible.

The invention is not restricted to the exemplary embodiments which are described here and the aspects which are emphasized therein. Rather, within the scope specified by way of the claims, a multiplicity of modifications are possible which lie within the capabilities of a person skilled in the art.

What is claimed is:

1. A power-shiftable multiple-gear transmission (12) with an input shaft (14) driven by at least one electrical machine (10), the power-shiftable multiple-gear transmission is provided with a shaft (16), a first gear stage (18), and a second gear stage (26),
   wherein the first gear stage (18) is provided with a first transmission ratio i1 and with a first pinion (20), wherein the first pinion (20) is provided as a first power transmission element and wherein the first pinion (20) is provided with a spur gear toothing system, wherein the first pinion (20) is arranged with a freewheel (21) on the input shaft (14), wherein the first gear stage (18) includes a first gearwheel (22) with a spur gear toothing system,
   wherein the second gear stage (26) includes a second transmission ratio i2, a second pinion (28) and with a second gearwheel (30), wherein the second pinion (28) and the second gearwheel (30) are configured with a spur gear toothing system,
   wherein the first gear stage (18) includes a first clutch (24) and wherein the second gear stage (26) includes a second clutch (32) that is disconnected from the first clutch (24),
   wherein the second pinion (28) is configured in a sleeve shape and is mounted rotatably on the input shaft (14) and wherein the second pinion (28) is part of the second clutch (32),
   wherein the first gearwheel (22) is mounted rotatably on the shaft (16), and
   wherein the first gearwheel (22) is configured in a sleeve shape and is part of the first clutch (24).

2. The power-shiftable multiple-gear transmission (12) as claimed in claim 1, wherein the power-shiftable multiple-gear transmission (12) has a final gear stage (34).

3. The power-shiftable multiple-gear transmission (12) as claimed in claim 2, wherein the final gear stage (34) is designed as a spur gear toothing system with a third pinion (36) and a third gearwheel (38).

4. The power-shiftable multiple-gear transmission (12) as claimed in claim 3, wherein the second gearwheel (30) and the third pinion (36) are arranged fixedly on the shaft (16) for conjoint rotation.

5. An E-axle module (78) as front and/or rear axle of an electrically driven or hybrid driven vehicle with a power-shiftable multiple-gear transmission (12) as claimed in claim 1 and with at least one electric machine (10).

6. The power-shiftable multiple-gear transmission (12) as claimed in claim 1, wherein the power-shiftable multiple-gear transmission (12) is part of an E-axle module (78) of an electrically driven or hybrid driven vehicle.

* * * * *